US012617125B2

(12) United States Patent
Schnellbach et al.

(10) Patent No.: US 12,617,125 B2
(45) Date of Patent: May 5, 2026

(54) PELLETIZING APPARATUS FOR THE PRODUCTION OF PELLETS FROM A MELT FLOW AND RELATED OPERATING AND MAINTENANCE METHOD

(71) Applicant: NORDSON CORPORATION, Westlake, OH (US)

(72) Inventors: Nikolai Schnellbach, Münster (DE); Stefan Wöstmann, Münster (DE)

(73) Assignee: Nordson Corporation, Westlake, OH (US)

( * ) Notice: Subject to any disclaimer, the term of this patent is extended or adjusted under 35 U.S.C. 154(b) by 508 days.

(21) Appl. No.: 18/011,229

(22) PCT Filed: Jun. 23, 2021

(86) PCT No.: PCT/US2021/038568
§ 371 (c)(1),
(2) Date: Dec. 19, 2022

(87) PCT Pub. No.: WO2021/262781
PCT Pub. Date: Dec. 30, 2021

(65) Prior Publication Data
US 2023/0294328 A1 Sep. 21, 2023

(30) Foreign Application Priority Data
Jun. 24, 2020 (EP) .................................... 20182058

(51) Int. Cl.
B29B 9/06 (2006.01)
B29C 48/00 (2019.01)
B29K 105/00 (2006.01)

(52) U.S. Cl.
CPC .......... B29B 9/065 (2013.01); *B29C 48/0022* (2019.02); *B29K 2105/251* (2013.01)

(58) Field of Classification Search
CPC ............................ B29B 9/065; B29C 48/0022
See application file for complete search history.

(56) References Cited

U.S. PATENT DOCUMENTS 4,759,889 A 7/1988 Voss
5,223,279 A * 6/1993 Lambertus ................ B29B 9/06
425/186
(Continued)

FOREIGN PATENT DOCUMENTS

CN 104511981 A 4/2015
CN 106426617 A 2/2017
(Continued)

OTHER PUBLICATIONS

IPEA/409—International Preliminary Report on Patentability Mailed on Jan. 5, 2023 for WO Application No. PCT/US21/038568.
(Continued)

*Primary Examiner* — Seyed Masoud Malekzadeh
(74) *Attorney, Agent, or Firm* — BakerHostetler

(57) ABSTRACT

A pelletizing apparatus for the production of pellets from a melt flow comprising a pelletizer (12, 112), a cutting chamber (14, 114, 172), and a suspension structure (4, 104) for suspension of the pelletizer (12, 112) and/or the cutting chamber, wherein the suspension structure (4, 104) has a stationary portion (8, 108) and a portion (6, 106) connected rotatably about an axis of rotation (18, 118) to the stationary portion (8, 108) by means of a joint (16, 116). According to the invention it is proposed that the pivotable portion (6, 106) has a substantially horizontal support arm (20, 120) which extends from the axis of rotation (18, 118) and has a distal end (22, 122), wherein in the region of the distal end (22, 122) the pivotable portion (6, 106) has a support (10, 110) adapted to support the pivotable portion (6, 106) in a vertical direction (24, 124).

20 Claims, 12 Drawing Sheets

(56)                    References Cited

U.S. PATENT DOCUMENTS

|  |  |  |  |  |
|---|---|---|---|---|
| 7,128,546 | B2 * | 10/2006 | Chszaniecki | B29B 9/065 |
|  |  |  |  | 425/70 |
| 10,730,218 | B2 * | 8/2020 | Veltel | B30B 11/24 |
| 2005/0023387 | A1 | 2/2005 | Chszaniecki et al. |  |
| 2005/0202114 | A1 | 9/2005 | Chszaniecki |  |
| 2010/0043616 | A1 * | 2/2010 | Edelman | B26D 7/2628 |
|  |  |  |  | 83/13 |
| 2012/0076884 | A1 * | 3/2012 | Schmidt | A23P 30/20 |
|  |  |  |  | 425/308 |
| 2012/0267818 | A1 | 10/2012 | Eloo et al. |  |
| 2013/0224321 | A1 * | 8/2013 | Eloo | B29B 9/065 |
|  |  |  |  | 137/883 |
| 2015/0072037 | A1 | 3/2015 | Chen |  |
| 2018/0104877 | A1 | 4/2018 | Veltel et al. |  |

FOREIGN PATENT DOCUMENTS

| CN | 106976177 | A | 7/2017 |
|---|---|---|---|
| CN | 206812267 | U | 12/2017 |
| CN | 108207110 | A | 6/2018 |
| CN | 111469300 | A | 7/2020 |
| DE | 10151434 | A1 | 4/2003 |
| DE | 10234229 | A1 | 2/2004 |
| DE | 102005007102 | A1 | 8/2006 |
| DE | 202016006419 | U1 | 11/2016 |
| EP | 3308920 | A1 | 4/2018 |
| EP | 3549738 | A1 | 10/2019 |
| FR | 0866398 | A | 8/1941 |
| GB | 0543605 | A | 3/1942 |
| JP | 10-166357 | A | 6/1998 |
| JP | 2005-506220 | A | 3/2005 |
| JP | 2005-297227 | A | 10/2005 |
| JP | 2015-074143 | A | 4/2015 |
| JP | 2019-532855 | A | 11/2019 |

OTHER PUBLICATIONS

ISA/220—Notification of Transmittal or Search Report and Written Opinion of the ISA, or the Declaration Mailed on Sep. 20, 2021 for WO Application No. PCT/US21/038568.

* cited by examiner

PELLETIZING APPARATUS FOR THE PRODUCTION OF PELLETS FROM A MELT FLOW AND RELATED OPERATING AND MAINTENANCE METHOD

CROSS REFERENCE TO RELATED APPLICATIONS

This application is a National Stage Application of International Patent App. No. PCT/US2021/038568, filed Jun. 23, 2021, which claims priority to European Patent Application No. 20182058.6, filed Jun. 24, 2020, the entire disclosures of both of which are hereby incorporated by reference as if set forth in their entirety herein.

FIELD OF THE INVENTION

The invention concerns a pelletizing apparatus for the production of pellets from a melt flow comprising a pelletizer, a cutting chamber, and a suspension structure for suspension of the pelletizer and/or the cutting chamber, wherein the suspension structure has a stationary portion and a portion connected rotatably about an axis of rotation to the stationary portion by means of a joint.

BACKGROUND TO THE INVENTION

Such pelletizing apparatuses for the production of pellets from a melt flow comprising a liquefied plastic are known from the state of the art. They are based on the functional principle that melt, for example in the form of a multiplicity of melt strands, is fed to a cutting chamber, wherein the melt is then cooled in the cutting chamber by means of the feed of a fluid and comminuted by means of a pelletizer. The pelletization method in question is also referred to as underwater pelletization.

Particularly in the event of changes in material in respect of the melt or also in relation to maintenance operations which are to be regularly carried out the individual components of a pelletization apparatus are to be separated from each other, for example the pelletizer from the cutting chamber.

To make that easier pelletizing apparatuses in which the pelletizer is mounted moveably on a rail system with respect to a stationarily arranged cutting chamber and pelletizing apparatuses in which the pelletizer and/or the cutting chamber are mounted in suspended relationship on a carrier structure are known from the state of the art. Such a suspended mounting of a pelletizer is known for example from EP 3 308 920 B1. The document in question discloses suspension of a pelletizer on a pivotal arm with a plurality of pivot joints, wherein the pivotal arm is mounted on a single suspension base.

It is found that the described state of the art suffers from the disadvantage that such a suspension arrangement on a single suspension base requires the elements of the pivotal arm to be of massive dimensions as, by virtue of the typically high masses of the pelletizers, high levels of moment are applied to the suspension base by way of a lever arm formed by the pivotal arm. Such an apparatus is therefore suitable at most only for smaller and lighter pelletizers. In addition there is found to be the disadvantage that only the pelletizer can be pivoted by means of the arrangement in question, in relation to the further components of the pelletizing apparatus. If further components of the pelletizing apparatus are to be subjected to maintenance then the previously known suspension arrangement is unable in that respect to provide any support.

SUMMARY OF THE INVENTION

With that background in mind the object of the present invention is to develop a pelletizing apparatus of the kind set forth in the opening part of this specification such that the disadvantages encountered in the state of the art are overcome to the greatest possible extent. In particular the invention seeks to provide an apparatus which allows suspended mounting of a pelletizer and/or a cutting chamber, which at the same time is as easy and inexpensive to produce as possible and in addition is suitable even for suspending heavy pelletizers.

According to the invention that object is attained in a pelletizing apparatus of the kind set forth in the opening part of this specification in that the pivotable portion has a substantially horizontal support arm which extends from the axis of rotation and has a distal end, wherein in the region of the distal end the pivotable portion has a support adapted to support the pivotable portion in a vertical direction (claim 1).

The invention makes use of the realisation that a support means for the pivotable portion by means of a support arranged at a distal end of the horizontal support arm is advantageously suitable for supporting the pivotable portion so that it can mount heavy pelletizers in suspended relationship and thus can be of dimensions which are as material-saving and inexpensive as possible. Such a pelletizing apparatus advantageously permits pivotal movement of the pelletizer with respect to the cutting chamber, for example for maintenance of the components or for cleaning thereof upon a change in material. In addition the ground footprint required for the operation of such a pelletizing apparatus in a manufacturing environment is minimised.

A development of the invention provides that the support has rollers at its underside. The provision of such rollers has proven to be advantageous to permit easy pivotablility of the pivotable portion about the axis of rotation. It is thus possible for the operator to pivot the pelletizer with respect to the cutting chamber with the application of the only a low level of force, for example for maintenance purposes. The rollers provide for support on the floor of a factory, on which the pelletizing apparatus stands.

According to a preferred embodiment the support extends substantially vertically. Such a vertical support, involving a low material consumption, makes it possible to carry high forces and thus permits even heavier pelletizers to be supported. In an alternative embodiment the support extends in a curved or inclined configuration. Such a design configuration for the support has been found to be advantageous in particular for circumventing local obstacles.

In a preferred development the pivotable portion has at least one substantially horizontally extending runner rail having a longitudinal axis or is formed therefrom, wherein the runner rail is adapted to mount the pelletizer in suspended relationship moveably along the longitudinal axis. Arranging such a runner rail on the pivotable portion advantageously permits not just a change in the angular position of the pelletizer relative to the cutting chamber but also a translatory movement of the pelletizer relative to the cutting chamber. In other words the arrangement permits the pelletizer to be moved with a translatory movement away from the cutting chamber along the runner rail in the direction of the longitudinal axis in order thereby to improve accessibility both to the cutting chamber and also the pelletizer for maintenance purposes and the like.

In a preferred embodiment the support arm is afforded by at least one and in particular two runner rails. The mass of the support arm can thereby be further reduced, wherein an embodiment with two runner rails permits the pelletizer to be suspended in particularly tip-resistant fashion.

In a preferred development the pelletizer is accommodated in a carrier structure, wherein the carrier structure can be reversibly connected to the at least one runner rail and has at least one adjusting means adapted to set a vertical position of the pelletizer. That makes it possible for the vertical position of the pelletizer to be adapted by means of the adjusting means to for example the position of the cutting chamber. In addition such a carrier structure, by virtue of the adjustment options involved, can be used for a large number of pelletizer types and thus in dependence on the type of pelletizer actually mounted there can be adapted by means of the adjusting means to the other components of the pelletizing apparatus in relation to vertical positioning.

In a further preferred embodiment the pelletizing apparatus has a process water feed fluid-conductingly coupled to the cutting chamber and a process water and pellet discharge fluid-conductingly coupled to the cutting chamber, wherein the process water feed and the process water and pellet discharge is arranged on the stationary portion of the suspension structure. That ensures secure stationary mounting of the process water feed as well as the process water and pellet discharge wherein the cutting chamber at the same time can be reversibly coupled to the process water feed and the process water and pellet discharge in such a way as to make it easier to replace and maintain the cutting chamber as well as an apertured plate mounted therein.

According to a second aspect of the invention for attaining the object of the invention or according to an advantageous development of the invention according to the first aspect it is proposed according to the invention that the stationary portion of the suspension structure has at least one substantially horizontally extending second runner rail having a second longitudinal axis, wherein the pelletizing apparatus further has a start-up valve connected fluid-conductingly to the cutting chamber, and wherein the second runner rail is adapted to carry the cutting chamber and/or the start-up valve moveably along the longitudinal axis.

The second aspect of the invention or the advantageous development makes use of the realisation that in pelletizing apparatuses known from the state of the art a cutting chamber and/or a start-up valve, particularly when they involve a high temperature, are accessible in the context of maintenance and cleaning operations only with a relatively high level of effort and complexity, in which respect the second runner rail according to the invention advantageously makes it possible to move the components along the second longitudinal axis of the second runner rail.

In a preferred embodiment the stationary portion of the suspension structure has two substantially vertical supports and a substantially horizontally extending carrier portion connecting the vertical supports, wherein the second runner rail is arranged on the carrier portion, in particular extending parallel to the carrier portion. In that way the force due to weight of the cutting chamber and/or the start-up valve is advantageously applied to the carrier structure and at the same time the arrangement makes it possible for both the cutting chamber and the start-up valve and also the pelletizer to be moved away from each other by pivotal movement or translatory movement in such a way that an extruder which can be coupled to the start-up valve is accessible after the components are moved away from each other. That provides that a so-called extrusion screw installed in the extruder becomes accessible at the same time and can be replaced or maintained.

In addition preferably the second runner rail is arranged rotatably about a second axis of rotation on the stationary portion of the suspension structure. In that respect the mobility of the cutting chamber and/or start-up valve is enhanced by a further degree of freedom, namely a rotational degree of freedom, whereby accessibility to the components is improved and they are further easier to maintain.

In a preferred development the cutting chamber and/or the start-up valve are mounted in a carrier structure, wherein the carrier structure can be reversibly connected to the second runner rail and has at least one adjusting means adapted to set a vertical position of the cutting chamber and/or the start-up valve. Such a carrier structure permits easy moveability of the start-up valve and/or the cutting chamber, even when those components are heated, wherein the adjusting means simultaneously permits adaptation of the vertical position of the cutting chamber and/or the start-up valve, for example in relation to the stationarily arranged process water feed and process water and pellet discharge. In addition thermal expansion phenomena of individual components can be compensated thereby.

According to a third aspect of the invention or according to an advantageous development of the invention according to the first aspect it is proposed according to the invention that the cutting chamber is a first cutting chamber and the pelletizing apparatus has an additional second cutting chamber, wherein the first and second cutting chambers are fluid-conductingly coupled to the start-up valve, and the pelletizer is adapted to be selectively coupled, in particular by pivotal movement of the pivotable portion, to the first cutting chamber or the second cutting chamber.

The third aspect of the invention or the advantageous development, to attain the object of the invention, makes use of the realisation that the provision of a second cutting chamber which is fluid-conductingly coupled to the start-up valve can advantageously be used to minimise the set-up times of a pelletizing apparatus in question, while at the same time only a single pelletizer is to be provided for operation of the pelletizing apparatus. In other words, when the pelletizer is connected in operation to the first cutting chamber the second cutting chamber is made ready and in particular an apertured plate contained therein is preheated, and the pelletizing operation can be continued almost without interruption after changing the pelletizer from the first cutting chamber to the second cutting chamber. Protracted heating and maintenance times are eliminated or can be markedly minimised.

A further development of the invention provides that the start-up valve is in the form of a 4/3 directional control valve. According to a preferred development the 4/3 directional control valve is so designed and adapted as to provide a fluid-conducting connection to either the first or the second cutting chamber.

In addition it is preferred if the start-up valve has a central axis, wherein the axis of rotation of the suspension structure substantially corresponds to the central axis. That arrangement has proven to be advantageous in improving coupleability between the pelletizer with the cutting chamber and the start-up valve.

An alternative preferred embodiment is distinguished in that the joint is arranged at the second runner rail, in particular at a top side of the second runner rail. That configuration has proven to be advantageous for enabling the desired pivotability of the pelletizer relative to the start-up valve and the at least one cutting chamber coupled thereto.

A further development of the invention provides that the first cutting chamber and the second cutting chamber are coupled to a common process water feed and/or process water and pellet discharge. That provides that upstream-disposed or downstream-disposed components of the process water feed and/or process water and pellet discharge are to be provided only once, whereby the complexity of the pelletizing apparatus is reduced and costs can be saved.

Further preferably the cutting chamber has a first transverse axis and the second cutting chamber has a second transverse axis, wherein the first cutting chamber is so arranged relative to the second cutting chamber that the first transverse axis assumes an angle of 75° to 135°, in particular 90°, relative to the second transverse axis. The described angle range has proven to be particularly suitable for ensuring that the pelletizer can be coupled to the cutting chambers in the optimum fashion, wherein a cutting chamber to be maintained is still readily accessible even when the pelletizer is coupled to the respective other cutting chamber.

The invention has been described hereinbefore with reference to a pelletizing apparatus. In a further aspect the invention concerns a method of operating a pelletizing apparatus, in particular a pelletizing apparatus having a first cutting chamber, a second cutting chamber and a pelletizer arranged pivotally relative to the cutting chambers.

The invention attains the above-indicated object in relation to the operating method with the steps: providing a first cutting chamber and a second cutting chamber, wherein the cutting chambers respectively have a heatable apertured plate, providing a pelletizer arranged pivotable relative to the cutting chambers, coupling the pelletizer to the first cutting chamber and producing pellets, preheating the apertured plate of the second cutting chamber during the production of pellets in the first cutting chamber, and pivoting the pelletizer from the first cutting chamber to the second cutting chamber after termination of the preheating of the apertured plate of the second cutting chamber.

The operating method involves the same advantages as the pelletizing apparatus according to the invention. In that respect attention is directed to the foregoing description and the content thereof is hereby incorporated.

To sum up the operating method according to the invention is based on the realisation that the second cutting chamber can advantageously be used to reduce the set-up times, by the respective cutting chamber which is not coupled to the pelletizer being prepared for the pelletizing operation, being for example preheated and/or maintained. It is possible in that way to minimise unproductive set-up times.

In addition it is preferred that the method further comprises the steps: providing a start-up valve fluid-conductingly connected to the first cutting chamber and the second cutting chamber, wherein the start-up valve has a bottom position in which melt is fed to neither of the cutting chambers, a first production position in which melt is fed exclusively to the first cutting chamber and a second production position in which melt is fed exclusively to the second cutting chamber, switching over the start-up valve into the bottom position prior to the pivotal movement of the pelletizer from the first cutting chamber to the second cutting chamber, and switching over the start-up valve into the second production position after the pivotal movement of the pelletizer from the first cutting chamber to the second cutting chamber. The use of a start-up valve which has a bottom position as well as a first and a second production position in the above-indicated manner has proven to be advantageous for supporting the procedure involved in changing the mode of operation from the first cutting chamber to the second cutting chamber.

The invention has been described hereinbefore with reference to an operating method. In a further aspect the invention concerns a method of maintaining a pelletizing apparatus, in particular an extruder of a pelletizing apparatus.

The invention attains the object set forth in the opening part of this specification in relation to the maintenance method with the steps: providing a pelletizer arranged pivotably relative to the extruder, providing a cutting chamber suspended moveably relative to the extruder, wherein the extruder is coupled to the cutting chamber and the pelletizer in a production configuration, pivoting the pelletizer away from the cutting chamber, moving the cutting chamber away from the extruder, and maintaining the extruder, in particular removing and maintaining an extrusion screw of the extruder.

A further development of the invention provides that the method in relation to the step of moving the cutting chamber away from the extruder includes the step of moving away a valve, in particular a start-up valve, coupled to the cutting chamber.

According to a preferred embodiment the method further comprises the step: maintaining the cutting chamber, in particular cleaning the cutting chamber and/or changing an apertured plate in the cutting chamber.

The maintenance method involves the same advantages as the pelletizing apparatus according to the invention. In that respect attention is directed to the foregoing description and the content thereof is hereby incorporated.

Further features and advantages of the invention will be apparent from the accompanying claims and the description hereinafter in which embodiments are described in detail with reference to diagrammatic drawings.

BRIEF DESCRIPTION OF THE DRAWINGS

Embodiments of the invention will now be described in detail, by way of example only, with reference to the accompanying drawings, in which.

DETAILED DESCRIPTION

Figure 1:
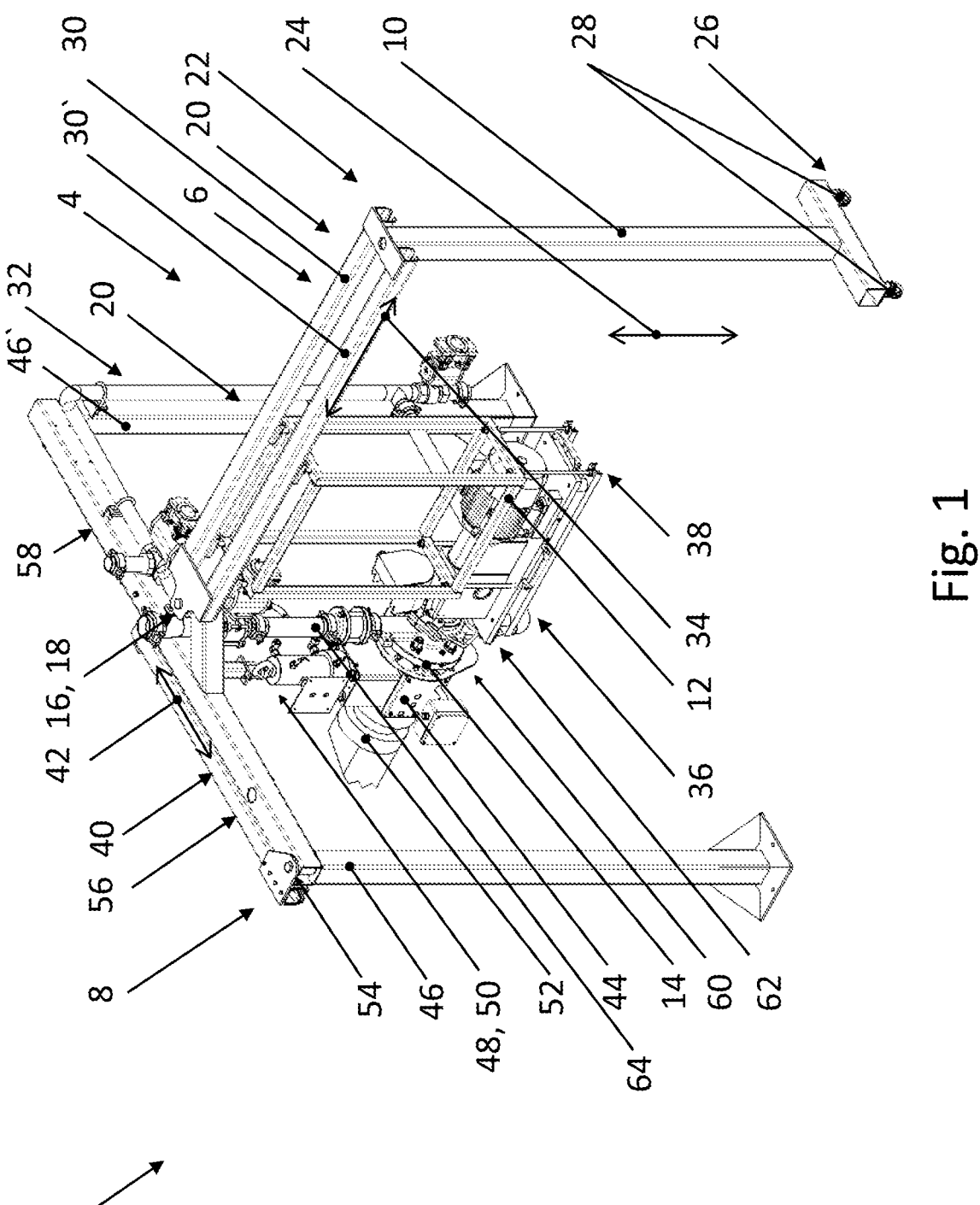
FIG. 1 shows a perspective view of a first embodiment of a pelletizing apparatus according to the invention.

FIG. 1 shows a pelletizing apparatus 2 for the production of pellets from a melt flow. The pelletizing apparatus 2 has a pelletizer 12, a cutting chamber 14 and a suspension structure 4 for suspending the pelletizer 12. The suspension structure 4 has a stationary portion 8 and a pivotable portion 6. The pivotable portion 6 is connected to the stationary portion 8 rotatably about an axis of rotation 18 by means of a joint 16. The pivotable portion 6 has a substantially horizontal support arm 20. The horizontal support arm 20 extends from the axis of rotation 18 and has a distal end 22. A support 10 is arranged on the pivotable portion 6 in the region of the distal end 22. The support 10 supports the pivotable portion 6 in a vertical direction 24.

The support 10 has rollers 28 at its underside 26. In operation the rollers 28 are in contact with a ground surface on which the pelletizing apparatus 2 is arranged (not shown) and permit easy pivotal movement of the pivotable portion 6.

The support 10 extends substantially vertically. The pivotable portion 6 has two horizontally extending runner rails 30, 30' having a longitudinal axis 34. In the present case the support arm 20 is formed by the two runner rails 30, 30'. The runner rails 30, 30' are adapted to carry the pelletizer 12 in suspended relationship moveably along the longitudinal axis 34.

For that purpose the pelletizer 12 is carried in a carrier structure 36. The carrier structure 36 can be reversibly connected to the runner rails 30, 30'. The carrier structure 36 has adjusting means 38 adapted to set a vertical position of the pelletizer 12 with respect to the vertical direction 24. The pelletizer 12 can thus be oriented in relation to the further components of the pelletizing apparatus 2, for example the cutting chamber 14.

The pelletizing apparatus 2 further has a process water feed 62 fluid-conductingly coupled to the cutting chamber 14 and a process water and pellet discharge 64 fluid-conductingly coupled to the cutting chamber 14. The process water feed 62 and the process water and pellet discharge 64 are part of a bypass arrangement 32. The process water feed 62 and the process water and pellet discharge 64 are arranged in a stationary portion 8 of the suspension structure 4. An apertured plate 60 is accommodated in the cutting chamber 14.

The stationary portion 8 of the suspension structure 4 has a substantially horizontally extending second runner rail 40. The second runner rail 40 has a second longitudinal axis 42. In addition the pelletizing apparatus 2 has a start-up valve 44 fluid-conductingly coupled to the cutting chamber 14. The second runner rail 40 is adapted to carry the cutting chamber 14 and the start-up valve 44 moveably along the longitudinal axis 42. The second runner rail 40 is arranged rotatably about a second axis of rotation 54 on the stationary portion 8 of the suspension structure 4. The cutting chamber 14 and the start-up valve 44 are accommodated in a carrier structure 48. The carrier structure 48 can be reversibly connected to the second runner rail 40. The carrier structure 48 has an adjusting means 50. The adjusting means 50 is adapted to set a vertical position of the cutting chamber 14 and the start-up valve 44, along in particular the vertical direction 24.

The stationary portion 8 of the suspension structure 4 has two substantially vertical supports 46, 46' and a carrier portion 58 connecting the two supports 46, 46'. The carrier portion 58 is arranged substantially horizontally. The second runner rail 40 is arranged on the carrier portion 58, in particular extending parallel to the carrier portion 58. The pelletizing apparatus 2 further has an extruder 52 which in operation is coupled to the start-up valve 44.

In the state shown in FIG. 1 the pelletizing apparatus 2 is in a production configuration in which the extruder 52 is coupled to the start-up valve 44 and the cutting chamber 14. The cutting chamber 14 in turn is coupled to the pelletizer 12. Material to be extruded is extruded in the extruder 52, passed to the cutting chamber 14 and cooled down in the cutting chamber 14 by means of the process water fed by way of the process water feed 62. The melt is further cut during cooling, in particular by means of a cutting unit 66 (see FIG. 5) of the pelletizer 12. A mixture of pellets and process water then leaves the cutting chamber 14 by way of the process water and pellet discharge 64.

Figure 2:
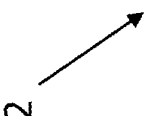
FIG. 2 shows a plan view of the embodiment of the pelletizing apparatus according to the invention shown in FIG. 1.
Figure 3:
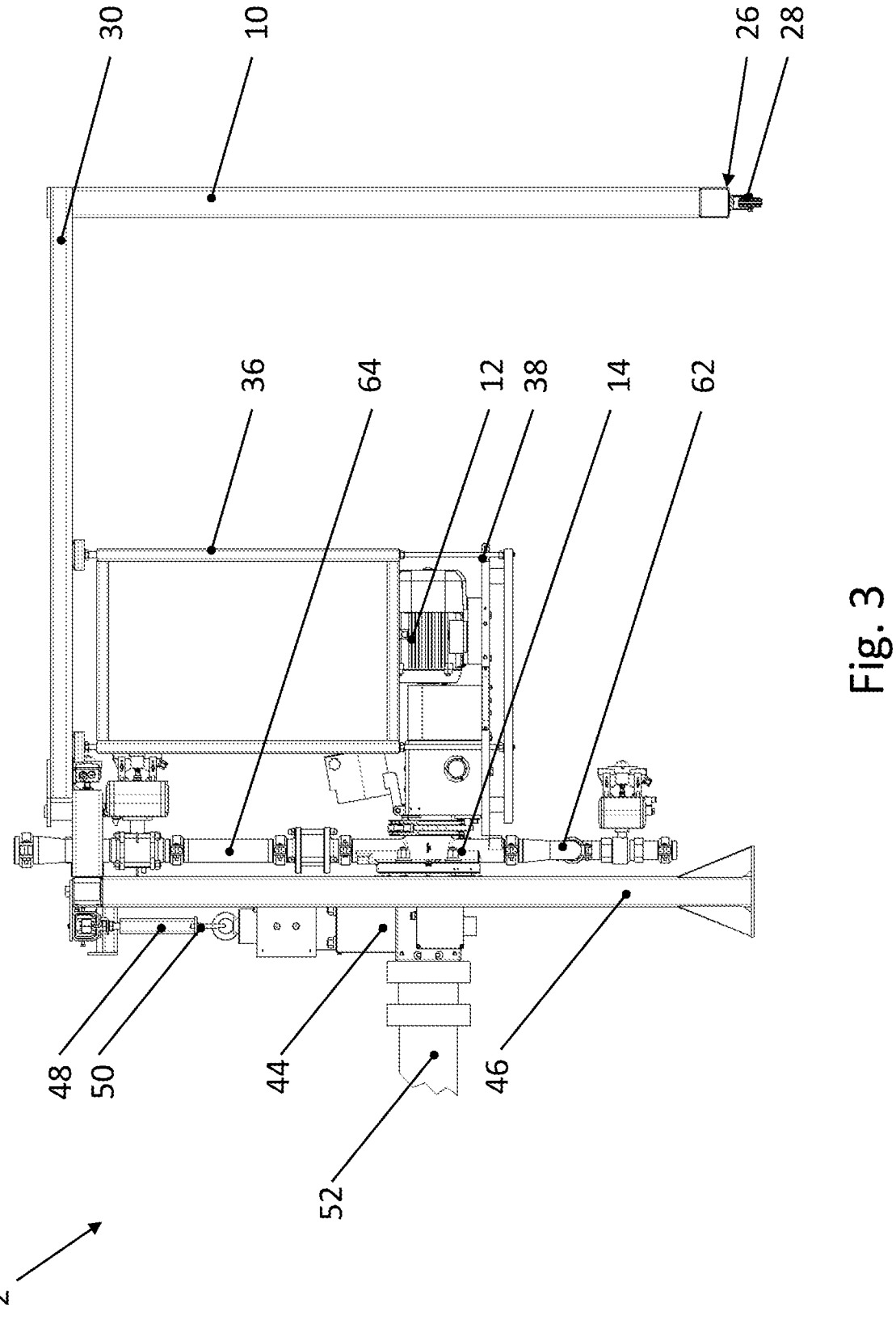
FIG. 3 shows a side view of the embodiment of the pelletizing apparatus according to the invention as shown in FIGS. 1 and 2, FIGS. 4 to 6 show perspective views of the embodiment of the pelletizing apparatus according to the invention as shown in FIGS. 1 to 3 in different operating positions.

FIG. 2 shows a plan view of the pelletizing apparatus 2. Here the pelletizing apparatus is also in the production configuration. As can be seen from FIG. 2 the pelletizer 12 can be pivoted about the axis of rotation 18 and moved with a translatory movement along the longitudinal axis 34 of the runner rails 30, 30' in the direction of the distal end 22. The cutting chamber 14 and the start-up valve 44 in turn can be moved along the longitudinal axis 42 by means of the second runner rail 40, as is clear in the Figures hereinafter. FIG. 3 shows a side view of the pelletizing apparatus 2 in the production configuration shown in FIGS. 1 and 2.

Figure 4:
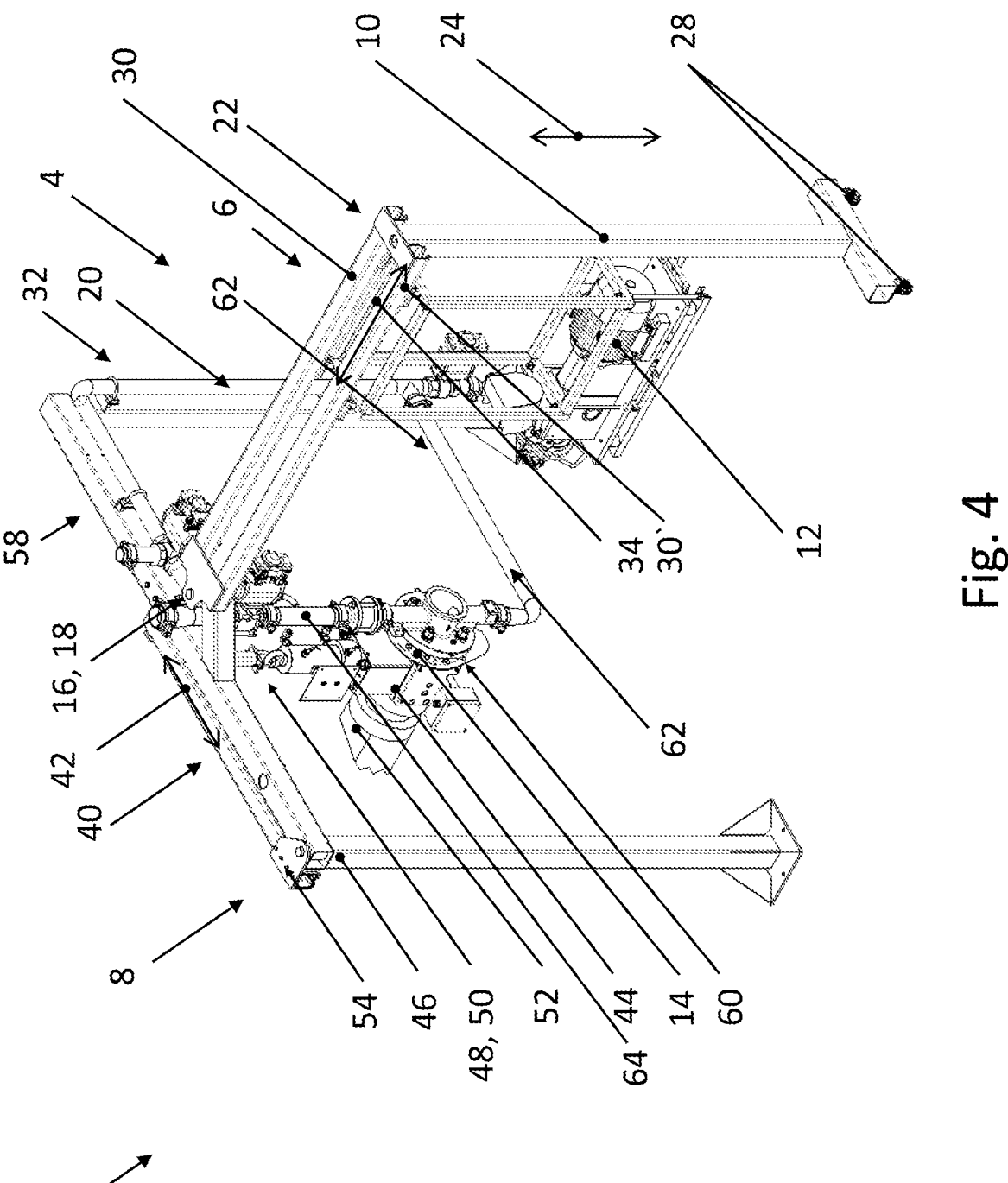

FIG. 4 shows the pelletizing apparatus 2 in a maintenance configuration. In comparison with the state shown in FIGS. 1 and 3 the pelletizer 12 has now been moved along the longitudinal axis 34 of the runner rails 30, 30' in the direction of the distal end 22. The cutting chamber 14 including a heatable apertured plate 60 disposed in the cutting chamber 14 is now accessible for cleaning purposes or for replacement of the heatable apertured plate 60.

Figure 5:
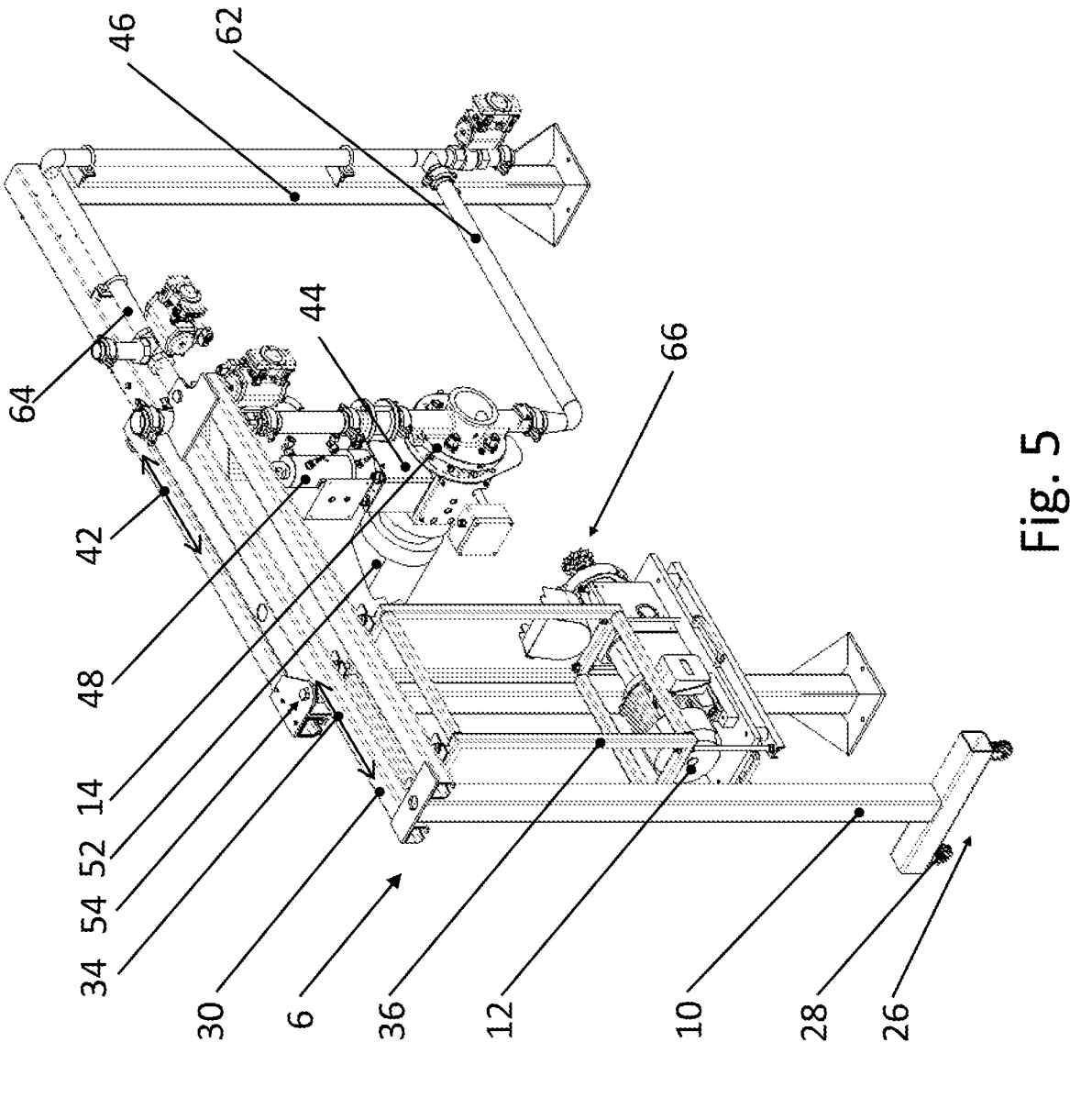
Figure 6:
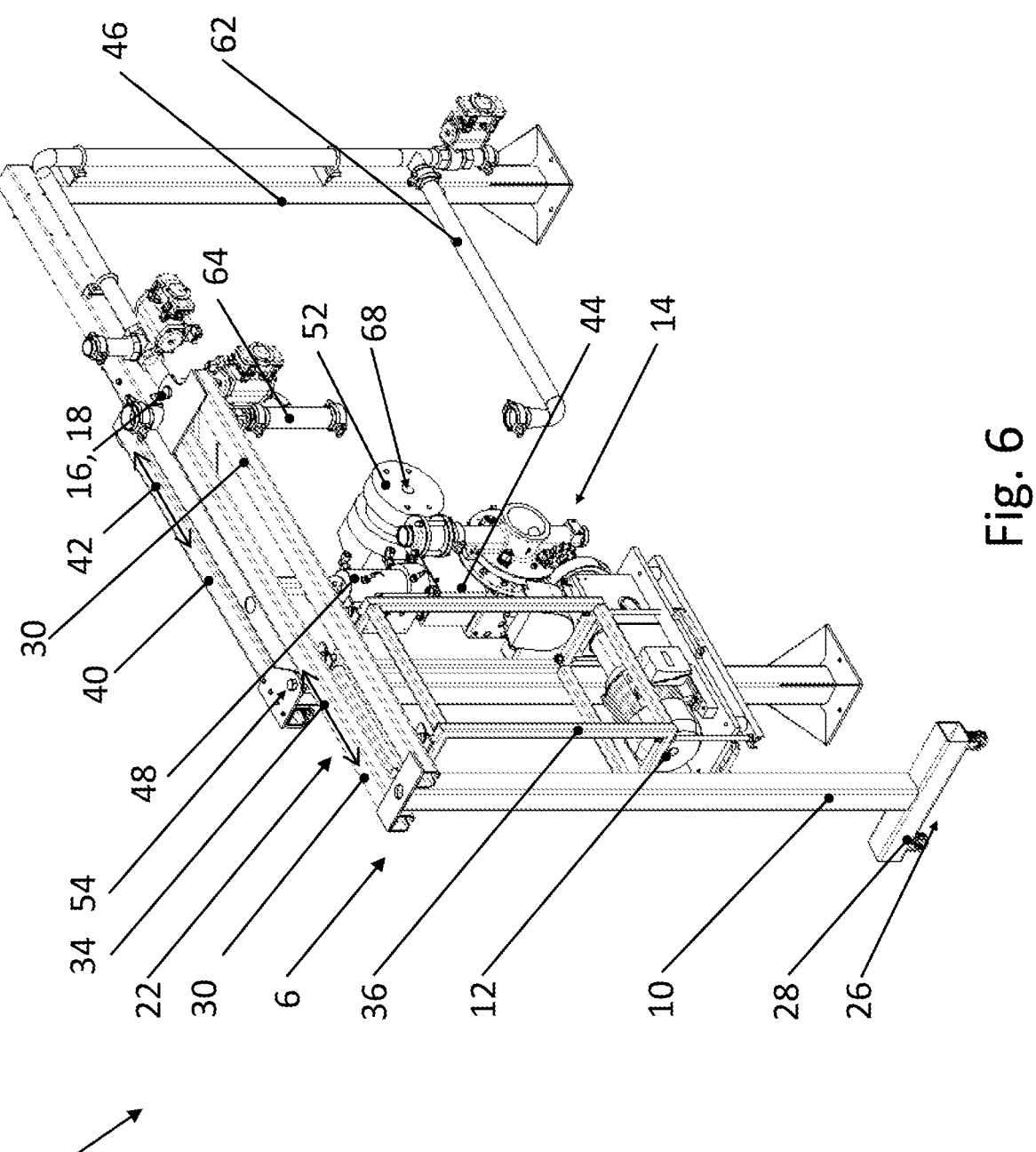
Figure 7:
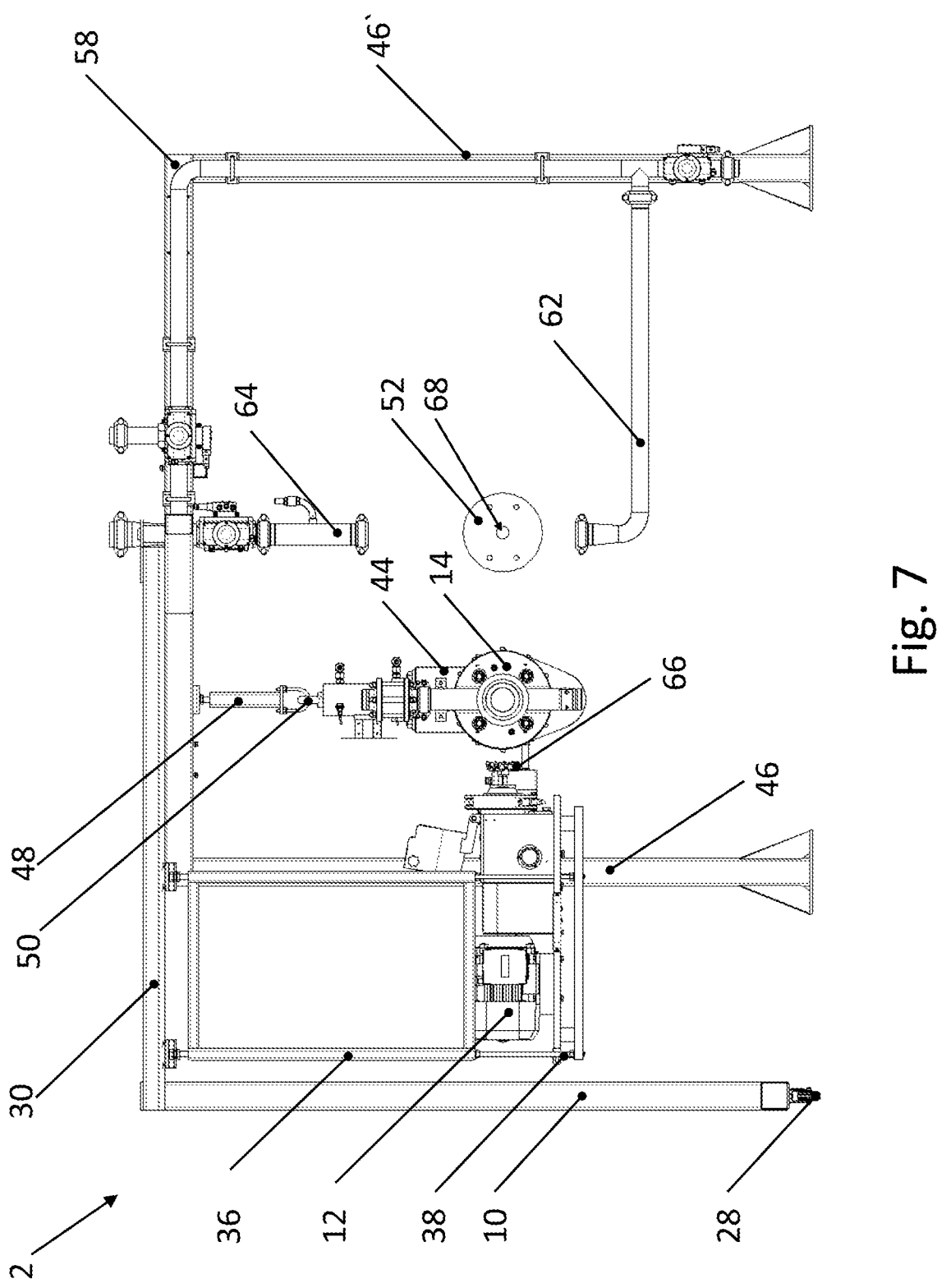
FIG. 7 shows a side view of the embodiment of the pelletizing apparatus according to the invention as shown in FIGS. 1 to 6 in a maintenance position.

To further improve accessibility to the cutting chamber 14 and the further components the pivotable portion 6 can be pivoted, for example in the direction shown in FIG. 5. FIG. 6 shows an operating state in which not only is the pelletizer 12 displaced with a translatory movement in the direction of the distal end 22 and the pivotable portion 6 as such has been pivoted, but in addition the start-up valve 44 has been moved with a translatory movement by means of the carrier portion 48 along the longitudinal axis 42 of the second runner rail 40. Accordingly not only is the cutting chamber 14 accessible for maintenance work, but in particular also the extruder 52. The extruder 52 has an extrusion screw 68 which is to be cleaned and/or replaced at regular intervals. In the FIG. 6 configuration of the pelletizing apparatus 2 it is now possible to enjoy direct access to the extruder 52 and for example to maintain the extrusion screw 68 or remove it (so-called "pulling" of the extrusion screw 68). The operating state shown in FIG. 6 is shown as a side view in FIG. 7, in which case the advantageous accessibility of the individual components of the pelletizing apparatus 2, in particular the extruder 52, the cutting chamber 14 and the pelletizer 12 is particularly clear from FIG. 7.

Figure 8:
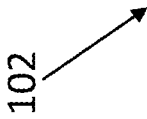
FIGS. 8 to 10 show various views of a second embodiment of a pelletizing apparatus according to the invention in various operating states.
Figure 9:
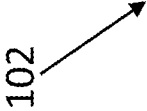

FIGS. 8 and 9 show a second embodiment of a pelletizing apparatus 102 according to the invention as a perspective view (FIG. 8) and a side view (FIG. 9).

FIG. 8 shows a pelletizing apparatus 102 for the production of pellets from a melt flow. The pelletizing apparatus 102 has pelletizer 112 and a cutting chamber 114, which in the present case is a first cutting chamber 114. The pelletizing apparatus 102 further has a second cutting chamber 172. The pelletizing apparatus 102 has a suspension structure 104 for suspending the pelletizer 112. The suspension structure 104 has a stationary portion 108. In addition the suspension structure 104 has a pivotable portion 106 which is connected to the stationary portion 108 rotatably about an axis of rotation 118 by means of a joint 116. The pivotable portion 106 has a substantially horizontal support arm 120 which extends from the axis of rotation 118 and has a distal end 122. The pivotable portion 106 has a support 110 in the region of the distal end 122. The support 110 is adapted to support the pivotable portion 106 in a vertical direction 124.

The support 110 has rollers 128 at its underside 126. The support 110 extends substantially vertically. The pivotable portion 106 has two substantially horizontally extending runner rails 130, 130' which in turn have a longitudinal axis 134. The runner rails 130, 130' are adapted to carry the pelletizer 112 moveably along the longitudinal axis 134. In the present case the support arm 120 is formed by two runner rails 130, 130'.

The pelletizer 120 is mounted in a carrier structure 136, the carrier structure 136 being reversibly connected to the runner rails 130, 130'. The carrier structure 136 further has an adjusting means 138 adapted to set a vertical position of the pelletizer 120 along the axis 124.

The stationary portion 108 of the suspension structure 104 has a horizontally extending second runner rail 140 with a longitudinal axis 142. In addition the pelletizing apparatus 102 has a start-up valve 144 fluid-conductingly coupled to the first cutting chamber 114 and the second cutting chamber 172. The second runner rail 140 is adapted to carry the cutting chamber 114 with the cutting chamber 172 and the start-up valve 144 moveably along the longitudinal axis 142.

The stationary portion 108 of the suspension structure 104 has two substantially vertical supports 146, 146'. The vertical supports 146, 146' are connected by a substantially horizontally extending carrier portion 158. The second runner rail 140 is arranged on the carrier portion 158, extending in particular parallel to the carrier portion 158. The second runner rail 140 is arranged on the stationary portion 108 of the suspension structure 104 rotatably about a second axis of rotation 154.

As can be seen in particular with reference to FIG. 9 the start-up valve 144 is accommodated in a carrier structure 148. The carrier structure 148 can be reversibly connected to the second runner rail 140. The carrier structure 148 has at least one adjusting means 150. The adjusting means 150 is adapted to set a vertical position of the start-up valve 144.

Figure 10:
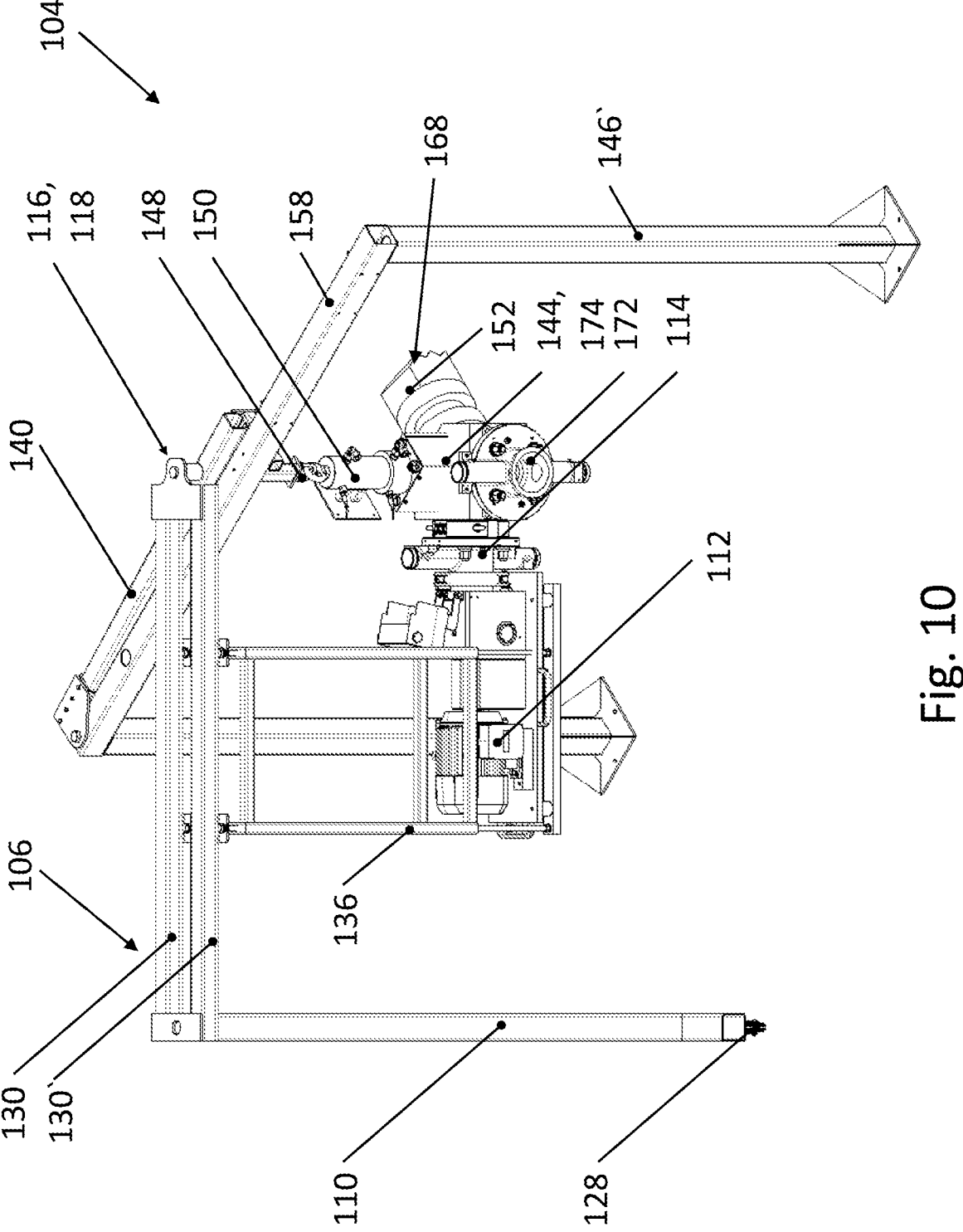

As is shown with reference to FIGS. 8 to 10 the pelletizer 112 is adapted by means of the suspension structure 104 to be selectively coupled to the first cutting chamber 114 or the second cutting chamber 172, in particular by pivotal movement of the pivotable portion 106. While the pelletizer 112 is coupled to one of the cutting chambers 114, 172 and is producing pellets the respective cutting chamber 114, 172 which is not in use can be maintained, cleaned or made ready, in particular in such a way that a heatable apertured plate 160, 160' arranged in the cutting chamber 114, 172 is preheated.

The start-up valve 144 is in the form of a 4/3 directional control valve 174. The 4/3 directional control valve 174 is so designed and adapted that it provides a fluid-conducting connection to either the first cutting chamber 114 or the second cutting chamber 172. In that way fluid is respectively fed to only one of the cutting chambers 114, 172, more specifically precisely the cutting chamber 114, 172 that is coupled to the pelletizer 112.

The joint 116 is arranged at the second runner rail 140, in particular at a top side 156 thereof. In addition the first cutting chamber 114 and the second cutting chamber 172 are coupled to a common process water feed 162 and/or process water and pellet feed discharge 164. The process water feed 162 and the process water and pellet feed discharge 164 are part of a bypass arrangement 132. The start-up valve 144 is coupled to an extruder 152.

With reference to FIG. 8 the pelletizer 112 is now coupled to the second cutting chamber 172. For coupling the pelletizer to the first cutting chamber 114 the pelletizer 112 is firstly moved with a translatory movement along the longitudinal axis 134 of the runner rails 130, 130' in the direction of the distal end 122. The pivotable portion 106 is then pivoted in such a way that the pelletizer 112 aligns with the first cutting chamber 114. After that the pelletizer 112 can again be moved with a translatory movement along the longitudinal axis 134 of the runner rails 130, 130' in the direction of the first cutting chamber 114 and coupled thereto. Accordingly the pelletizing apparatus 102 is then in the operating state shown in FIG. 10.

Figure 11:
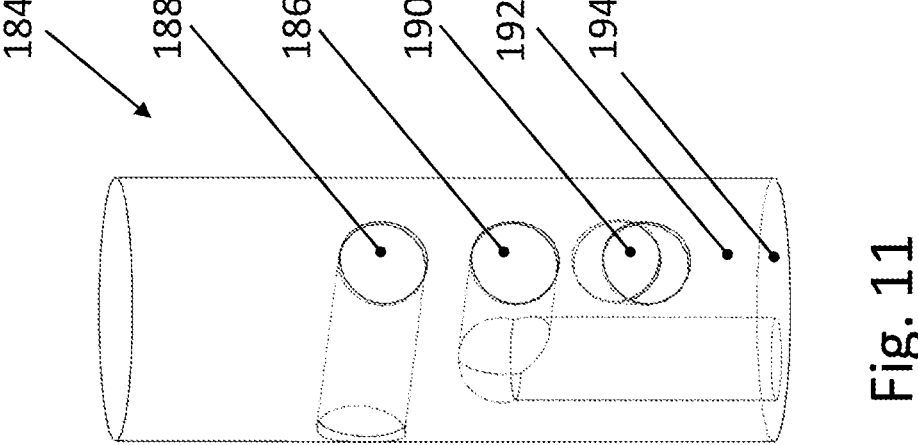
FIG. 11 shows a semi-transparent view of a valve spool of a pelletizing apparatus according to the invention as shown in FIGS. 8 to 10, and FIGS. 12 to 14 show a start-up valve of a pelletizing apparatus according to the invention in accordance with the embodiment shown in FIGS. 7 to 10 in different operating states.

FIGS. 11 to 14 show the structure and circuitry of the start-up valve 144 and a valve spool 184 accommodated therein. With reference to FIG. 11 the valve spool 184 has a total of three flow passages 186, 188, 190. All three flow passages 186, 188, 190 extend from a peripheral surface 192 into the valve spool 184. The flow passage 186 corresponds to a bottom position 196 of the 4/3 directional control valve 174. For that purpose the flow passage extends from the peripheral surface 192 towards an end face 194 of the valve spool 184. The other flow passages 188, 190 respectively correspond to a first production position 198 (see FIG. 13) and a second production position 200 (see FIG. 14) and extend from the peripheral surface 192 into the valve spool 184 and leave same again by way of the peripheral surface 192.

With reference to the orientation of the valve spool 184 shown in FIG. 11 displacement thereof is effected in the vertical direction in the 4/3 directional control valve 174. That vertical direction in relation to FIG. 11 corresponds to the plane of the drawing in FIGS. 12 to 14. In other words a movement of the valve spool 184 relative to the plane of the drawing in FIGS. 12 to 14 provides that a melt flow 182 is either fed to neither of the heatable nozzle plates 160, 160' (bottom position 196) or however is fed to one of the heatable nozzle plates 160, 160' when the melt inlet 182 is brought into contact with either the flow passage 188 for the first production position 198 or the flow passage 190 for the second production position 200 by a movement of the valve spool 184 in the plane of the drawing.

Figure 12:
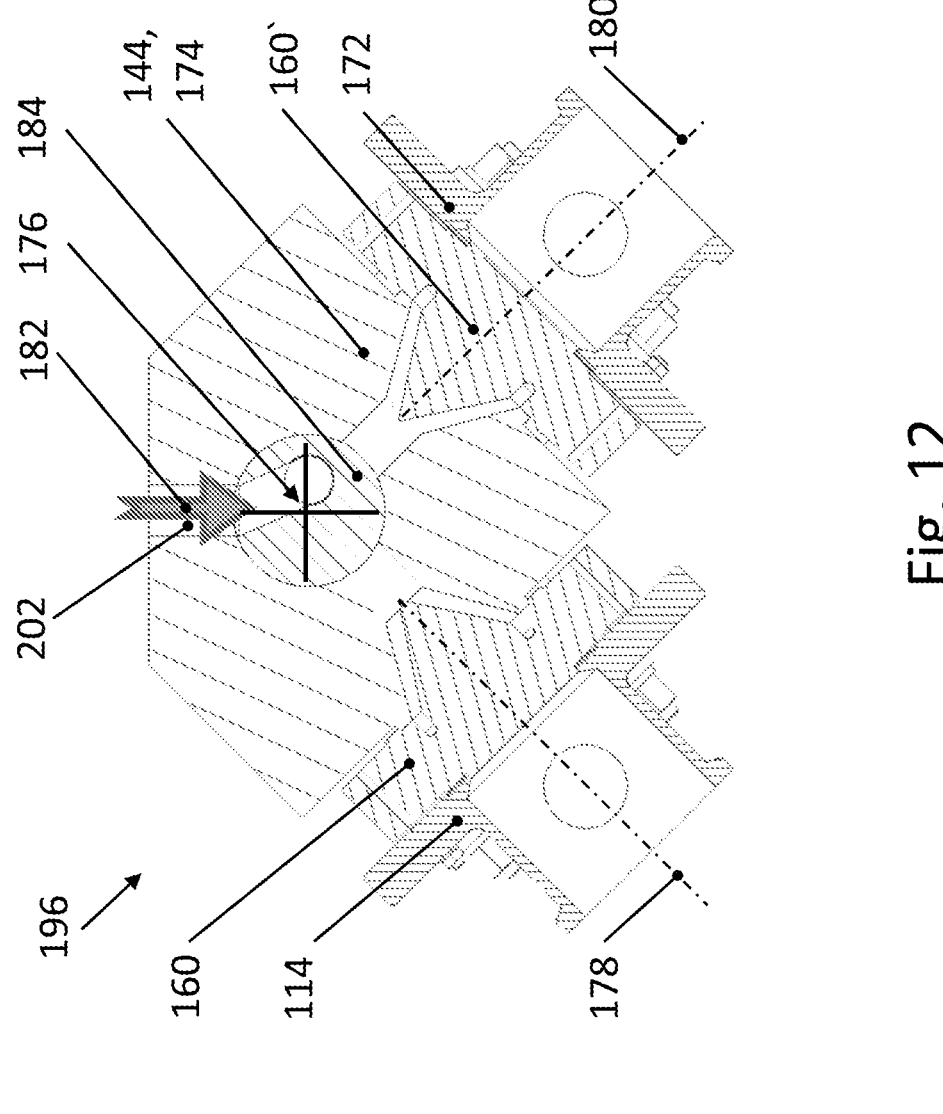

In the FIG. 12 state the 4/3 directional control valve 174 is in the bottom position 196. No melt 182 is fed from a melt inlet 202 to the first heatable apertured plate 160 and the second heatable apertured plate 160'. Accordingly no melt 182 is also fed to the first cutting chamber 114 and the second cutting chamber 172.

As can also be seen from FIG. 12 the start-up valve 144 has a central axis 176. The axis of rotation 118 of the suspension structure 104 (see for example FIG. 8) substantially corresponds to the central axis 176. In addition the first cutting chamber 114 has a transverse axis 178 and the second cutting chamber 172 has a transverse axis 180. The cutting chamber 114 is arranged relative to the second cutting chamber 172 in such a way that the transverse axis 178 is at an angle of 90 degrees relative to the second transverse axis 180.

Figures 13, 14:
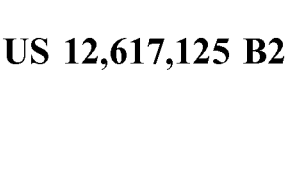

In the state shown in FIG. 13 the 4/3 directional control valve 174 or the start-up valve 144 is in the first production position 198 in which melt is fed only to the first cutting chamber 114 or the heatable nozzle plate 160.

In the state shown in FIG. 14 the 4/3 directional control valve 174 or the start-up valve 144 is in the second production position 200 in which melt is fed only to the second cutting chamber 172 or the heatable nozzle plate 160' respectively. A change from the bottom position 196 to the first production position 198 and the second production position 180 is effected by movement of the valve spool 184 in the plane of the drawing in FIGS. 12 to 14 with a translatory movement relative to the melt inlet 200.

The following steps are involved in operation of or also for preparation for the operating mode or further operating mode of the pelletizing apparatuses:

providing a first cutting chamber 114 and a second cutting chamber 172, wherein the cutting chambers 114, 172 respectively have a heatable apertured plate 160, 160'
  providing a pelletizer 112 arranged pivotably relative to the cutting chambers 114, 172,
  coupling the pelletizer 112 to the first cutting chamber 114 and producing pellets,
  preheating the apertured plate 160' of the second cutting chamber 172 during the production of pellets in the first cutting chamber 114, and
  pivoting the pelletizer 112 from the first cutting chamber 114 to the second cutting chamber 172 after termination of the preheating of the apertured plate 160' of the second cutting chamber 172; and/or
  providing a start-up valve 144 fluid-conductingly connected to the first cutting chamber 114 and the second cutting chamber 172, wherein the start-up valve 144 has a bottom position 196 in which melt 182 is fed to neither of the cutting chambers 114, 172, a first production position 198 in which fluid is fed exclusively to the first cutting chamber 114 and a second production position 200 in which melt 182 is fed exclusively to the second cutting chamber 172;
  switching over the start-up valve 144 into the bottom position 196 prior to the pivotal movement of the pelletizer 112 from the first cutting chamber 114 to the second cutting chamber 172; and
  switching over the start-up valve 144 into the second production position 200 after the pivotal movement of the pelletizer 112 from the first cutting chamber 114 to the second cutting chamber 172; and/or
  providing a pelletizer 12, 112 arranged pivotably relative to the extruder 52, 152;
  providing a cutting chamber 14, 114, 172 suspended moveably relative to the extruder 52, 152, wherein the extruder 52, 152 is coupled to the cutting chamber 14, 114, 172 and the pelletizer 12, 112 in a production configuration;
  pivoting the pelletizer 12, 112 away from the cutting chamber 14, 114, 172;
  moving the cutting chamber 14, 114, 172 away from the extruder 52, 152; and
  maintaining the extruder 52, 152, in particular removing and maintaining an extrusion screw 68, 168 of the extruder 52, 152; and/or
  moving away a valve 44, 144, in particular a start-up valve 44, 144, that is coupled to the cutting chamber; and/or maintaining the cutting chamber 14, 114, 172, in particular cleaning the cutting chamber 14, 114, 172 and/or changing an apertured plate 60, 160, 160' in the cutting chamber 14, 114, 172.

Although the disclosure has been described in detail, it should be understood that various changes, substitutions, and alterations can be made herein without departing from the spirit and scope of the invention as defined by the appended claims. Additionally, any of the embodiments disclosed herein can incorporate features disclosed with respect to any of the other embodiments disclosed herein. Moreover, the scope of the present disclosure is not intended to be limited to the particular embodiments described in the specification. As one of ordinary skill in the art will readily appreciate from that processes, machines, manufacture, composition of matter, means, methods, or steps, presently existing or later to be developed that perform substantially the same function or achieve substantially the same result as the corresponding embodiments described herein may be utilized according to the present disclosure.

LIST OF REFERENCES 2 pelletizing apparatus
4 suspension structure
6 pivotable portion
8 stationary portion
10 support
12 pelletizer
14 cutting chamber
16 joint
18 axis of rotation
20 support arm
22 distal end
24 vertical direction
26 underside of the support
28 rollers
30, 30' runner rail
32 bypass arrangement
34 longitudinal axis of the runner rail
36 pelletizer carrier structure
38 adjusting means of the pelletizer carrier structure
40 second runner rail
42 longitudinal axis of the second runner rail
44 start-up valve
46, 46' vertical support
48 carrier structure of cutting chamber and/or start-up valve
50 adjusting means of the carrier structure of cutting chamber and/or start-up valve
52 extruder
54 second axis of rotation
56 top side of the second runner rail
58 carrier portion
60 heatable apertured plate
62 process water feed
64 process water and pellet discharge
66 cutting unit
68 extrusion screw
102 pelletizing apparatus
104 suspension structure
106 pivotable portion
108 stationary portion
110 support
112 pelletizer
114 cutting chamber
116 joint

13

118 axis of rotation
120 support arm
122 distal end
124 vertical direction
126 underside of the support
128 rollers
130, 130' runner rail
132 bypass arrangement
134 longitudinal axis of the runner rail
136 pelletizer carrier structure
138 adjusting means of the pelletizer carrier structure
140 second runner rail
142 longitudinal axis of the second runner rail
144 start-up valve
146, 146' vertical support
148 carrier structure of cutting chamber and/or start-up valve
150 adjusting means of the carrier structure of cutting chamber and/or start-up valve
152 extruder
154 second axis of rotation
156 top side of the second runner rail
158 carrier portion
160 heatable apertured plate
162 process water feed
164 process water and pellet discharge
172 second cutting chamber
174 4/3 directional control valve
176 central axis of the start-up valve
178 transverse axis of the cutting chamber
180 transverse axis of the second cutting chamber
182 melt flow
184 valve spool
186 flow passage for bottom position
188 flow passage for first production position
190 flow passage for second production position
192 peripheral surface
194 end face
196 bottom position
198 first production position
200 second production position
202 melt inlet

The invention claimed is:

1. A pelletizing apparatus for producing pellets from a melt flow comprising
a pelletizer,
a cutting chamber, and
a suspension structure for suspension of the pelletizer and/or the cutting chamber,
wherein the suspension structure has a stationary portion and a pivotable portion connected rotatably about an axis of rotation to the stationary portion by means of a joint,
wherein the pivotable portion has a support arm which extends from the axis of rotation and has a distal end spaced from the axis of rotation in a distal direction,
wherein the pivotable portion has, in a region of the distal end, a vertical support adapted to support the pivotable portion in a vertical direction, and
wherein the pivotable portion comprises or is formed from at least one substantially horizontally extending runner rail extending along a longitudinal axis that extends from the axis of rotation to the distal end of the support arm, wherein the at least one substantially horizontally extending runner rail is adapted to mount the pelletizer in a suspended relationship moveably along the longitudinal axis, wherein the vertical support is offset from the axis of rotation and the stationary portion along the distal direction, which extends along the longitudinal axis, and wherein the vertical support is configured to vertically support the at least one substantially horizontally extending runner rail.

2. A pelletizing apparatus according to claim 1 wherein the vertical support has rollers at its underside.

3. A pelletizing apparatus according claim 1 wherein the vertical support extends substantially vertically.

4. A pelletizing apparatus according to claim 1 wherein the support arm is provided by at least one runner rail.

5. A pelletizing apparatus according to claim 1 wherein the pelletizer is accommodated in a carrier structure, wherein the carrier structure can be reversibly connected to at least one runner rail and has at least one adjusting means adapted to set a vertical position of the pelletizer.

6. A pelletizing apparatus according to claim 1 wherein a process water feed is fluid-conductingly coupled to the cutting chamber and a process water and pellet discharge is fluid-conductingly coupled to the cutting chamber, wherein the process water feed and the process water and pellet discharge are arranged on the stationary portion of the suspension structure.

7. A pelletizing apparatus according to claim 1, wherein the at least one substantially horizontally extending runner rail is at least one substantially horizontally extending first runner rail, wherein the longitudinal axis is a first longitudinal axis,
wherein the stationary portion of the suspension structure has at least one substantially horizontally extending second runner rail having a second longitudinal axis,
the pelletizing apparatus further has a start-up valve connected fluid-conductingly to the cutting chamber,
and that the at least one substantially horizontally extending second runner rail is adapted to carry the cutting chamber and/or the start-up valve moveably along the second longitudinal axis.

8. A pelletizing apparatus according to claim 1 wherein the stationary portion of the suspension structure has two substantially vertical supports and a substantially horizontally extending carrier portion connecting the vertical supports, wherein a second runner rail is arranged on the carrier portion.

9. A pelletizing apparatus according to claim 1 wherein a start-up valve has a central axis, wherein the axis of rotation of the suspension structure substantially corresponds to the central axis.

10. A method of maintaining a pelletizing apparatus according to claim 1, comprising the steps:
providing the cutting chamber suspended moveably relative to an extruder of the pelletizing apparatus, wherein the extruder is coupled to the cutting chamber and the pelletizer in a production configuration;
pivoting the pelletizer away from the cutting chamber;
moving the cutting chamber away from the extruder; and
maintaining the extruder, including removing and maintaining an extrusion screw of the extruder.

11. A method according to claim 10 wherein the step of moving the cutting chamber away from the extruder includes the step:
moving away a valve, which is coupled to the cutting chamber.

12. A pelletizing apparatus for producing pellets from a melt flow comprising a pelletizer, a cutting chamber, and a suspension structure for suspension of the pelletizer and/or the cutting chamber, wherein the suspension structure has a stationary portion and a pivotable portion connected rotatably about an axis of rotation to the stationary portion by means of a joint, wherein the pivotable portion has a support arm which extends from the axis of rotation and has a distal end, wherein the pivotable portion has, in a region of the distal end, a vertical support adapted to support the pivotable portion in a vertical direction, wherein the cutting chamber is a first cutting chamber and the pelletizing apparatus has an additional second cutting chamber, wherein the first and second cutting chambers are fluid-conductingly coupled to a start-up valve, and wherein the pelletizer is adapted to be selectively coupled to the first cutting chamber or the second cutting chamber by pivoting the pivotable portion.

13. A pelletizing apparatus according to claim 12 wherein the start-up valve is in a form of a 4/3 directional control valve.

14. A pelletizing apparatus according to claim 12 wherein the pivotable portion has at least one substantially horizontally extending runner rail having a longitudinal axis or is formed therefrom, wherein the runner rail is adapted to mount the pelletizer in suspended relationship moveably along the longitudinal axis.

15. A pelletizing apparatus according to claim 12 wherein the first cutting chamber and the second cutting chamber are coupled to a common process water feed and/or process water and pellet discharge.

16. A pelletizing apparatus according to claim 12 wherein the cutting chamber has a first transverse axis and the second cutting chamber has a second transverse axis, wherein the cutting chamber is so arranged relative to the second cutting chamber that the first transverse axis assumes an angle of 45° to 135°, relative to the second transverse axis.

17. A method of operating a pelletizing apparatus according to claim 12, comprising the steps:

providing the first cutting chamber and the second cutting chamber, wherein the first cutting chamber and the second cutting chamber respectively have a heatable apertured plate, providing the pelletizer arranged pivotably relative to the first and second cutting chambers, coupling the pelletizer to the first cutting chamber and producing the pellets, preheating the apertured plate of the second cutting chamber during the producing of pellets in the first cutting chamber, and pivoting the pelletizer from the first cutting chamber to the second cutting chamber after termination of the preheating of the apertured plate of the second cutting chamber.

18. A method according to claim 17 and further comprising the steps:

providing the start-up valve, wherein the start-up valve has a bottom position in which melt is fed to neither of the first and second cutting chambers, a first production position in which the melt fluid is fed exclusively to the first cutting chamber and a second production position in which the melt is fed exclusively to the second cutting chamber;

switching over the start-up valve into the bottom position prior to the pivoting of the pelletizer from the first cutting chamber to the second cutting chamber; and switching over the start-up valve into the second production position after the pivoting of the pelletizer from the first cutting chamber to the second cutting chamber.

19. A pelletizing apparatus according to claim 12, wherein when the pelletizer is coupled to one of the first cutting chamber and the second cutting chamber, the pelletizer is configured to be decoupled from the one of the first cutting chamber and the second cutting chamber and then coupled to another one of the first cutting chamber and the second cutting chamber.

20. A pelletizing apparatus according to claim 12, wherein the distal end of the support arm is spaced from the axis of rotation in a distal direction, wherein a longitudinal axis extends from the axis of rotation to the distal end of the support arm, wherein the vertical support is offset from the axis of rotation and the stationary portion along the distal direction, which extends along the longitudinal axis, and wherein the vertical support is configured to vertically support the support arm.

* * * * *